Patented Nov. 21, 1933

1,936,533

UNITED STATES PATENT OFFICE 1,936,533

PHOSPHATES OF ALKYLOLAMINE COMPOUNDS AND THEIR PRODUCTION

Herbert O. Albrecht, Flint, Mich., assignor to E. I. du Pont de Nemours & Company, Wilmington, Del., a corporation of Delaware No Drawing. Application September 8, 1931
Serial No. 561,818

16 Claims. (Cl. 260—98)

This invention relates to new compositions of matter and more particularly it relates to improved products useful as compositions for coating metal and which are valuable for inhibiting the formation of rust on the metal surface.

Phosphoric acid, and materials having essentially the same action on the metal substrate (usually under the influence of heat), such as acid phosphates, and easily decomposable phosphates, have been used in paints for the purpose of increasing the resistance of the coated metal to rusting and to obtain other desirable effects. Free phosphoric acid is, insofar as I am aware, the most effective of these agents for the purpose mentioned. Among the disadvantages resulting from the presence of the phosphoric acid in insoluble form is the tendency of all or part of this agent to settle out of the paint mixture upon standing. This objection in some instances is a serious one, inasmuch as it is quite difficult to redisperse the phosphoric acid with the paint materials. Further disadvantages of directly incorporating the phosphoric acid into the coating composition according to the prior practice is the ready attack of metal containers by the phosphoric acid and the undesirable bodying effects due to a fine dispersion and adsorption of phosphoric acid, especially in asphaltic and pigmented products.

One method that has been proposed for getting phosphoric acid in substantially true solution in paints involves the use of phosphoric esters. Compositions containing these are, however, much less reactive than phosphoric acid at oven temperature with the metal substrate, and the neutral esters do not seem to be of much use. The acid esters are generally more expensive to prepare, and are less effective in improving corrosion resistance than phosphoric acid salts of the decomposable type. Insofar as I am aware the phosphoric acid salts of the decomposable type disclosed herein are the only ones that have been found to be sufficiently soluble.

This invention has as an object a new class of chemical compounds especially valuable for coating metal and which avoid the disadvantages mentioned in connection with the prior art. A further object resides in the method of making these compounds. Other objects will appear hereinafter.

In the preferred form of my invention my new compositions of matter comprise phosphates of triacid esters of triethanolamine with fatty or resin acids. These bodies are capable of forming adhesive films of an organic and japan-like nature when baked at elevated temperatures, and have the valuable and novel property of bringing phosphoric acid in the form of a salt into clear solution in hydrocarbon thinners. My new compositions are used alone, or in admixture with varnishes and paints, and with forced drying, as a first coat, or single protective coat, over metal.

The larger principle behind this invention is the production of a phosphoric acid compound capable of giving up its phosphoric acid to a metal on heating it as a coating for the same to a feasible temperature, and preferably not showing the properties of the acid to any extent while in solution in the container. The chemical reasoning which led to the production of the compounds which form the basis of this invention was to find, if possible, an amine body of sufficient basicity to hold phosphoric acid combined, and at the same time having a large enough hydrocarbon radical to counteract the effect of the nitrogen and oxygen atoms, and phosphoric radical in producing immiscibility with hydrocarbon thinners. Triethanolamine has sufficient basicity but does not yield a hydrocarbon-soluble phosphate, whereas its esters with long chain acids do.

The essential step in carrying out this invention is the synthesis of the triethanolamine esters, and formation of their phosphoric acid salts. My compositions are made as follows:

Three moles of the desired acid of high molecular weight for each mole of triethanolamine are put in a kettle of copper, Monel metal, or the like and heated about an hour at 350° to 480° F. The time and temperature are not very critical, since foaming gives indication that esterification is taking place, and the increasing insolubility of the product in alcohol is an indication of the formation of the desired material. The temperature will also be different for different acids, rosin, for instance, requiring a higher temperature. It is, however, desirable to reduce loss by evaporation and decomposition by the use of as low a temperature and short a holding time as possible, and to this end various mechanical devices and methods known to the art may be used.

The phosphoric acid is preferably added to the cooled and thinned basic ester formed as above. More phosphoric acid can be added without precipitation than corresponds to the phosphate of the base. An example of a composition successfully used for the purpose intended is:

| | Pounds |
|---|---|
| Linseed oil acids | 9.30 |
| Triethanolamine, commercial | 1.50 |

Heat to 350° F., then with agitation heat as rapidly as foaming permits to 480° F. and hold until 1 cc. does not mix with 5 cc. of 95% alcohol, but leaves the alcohol layer nearly colorless.

To .90 pounds of the cooled product add 1.05 pounds of mineral spirits and .15 pounds of orthophosphoric acid with vigorous stirring. (The product should be entirely clear when a sample is diluted with 10 parts of mineral spirits.)

The composition made in accordance with the above example will give a very thin and very adhesive primer coat, when used alone on metal and baked at 450° F.

When incorporating this product into paint products it may be added in any amount from the smallest having any appreciable effect, which will be found to be about 3%, up.

A satisfactory baking schedule for these products is 10 minutes at 450° F., about 10 minutes being used to attain this temperature, and another 10 minutes to cool the finished article. Lower temperatures will greatly increase the time required to dry the film thoroughly, but when the film has been dried the phosphoric acid will show its characteristic effect. 300° F. to 500° F. will usually cover the range of temperature which would be considered practical for using the materials described herein. The special condition for the use of my new compounds in part products, in the ordinary course of paint development work, will be indicated to those skilled in the paint art.

A typical example of the use of the material in a paint product is as follows:

| | Parts by weight |
|---|---|
| Gilsonite | 1.00 |
| Prepared oil (usually containing iron or manganese drier) | 1.00 |
| Black pigments | .16 |
| Mineral spirits | 2.00 |
| Ester phosphate compound | .4 |
| 30% Citric acid solution in alcohol | .04 |

The gilsonite is fluxed with the oil, and the black pigments ground in according to usual paint practice. The phosphate compound and citric acid solution are stirred into the finished material.

A hydroxy polybasic aliphatic acid such as citric or tartaric acid is included in the above composition to overcome the tendency of my new compounds, when added to some paint and varnish materials, though not when used alone, to give a peculiar alligatored appearance to the force-dried film. If citric or a similar acid is also added to these mixtures, the alligatoring effect is eliminated, and, consequently, the use of such an acid, where necessary, constitutes an integral part of this invention.

The product made according to the first example above will also give a very thin and very adhesive primer coat, or protective coat, when used alone on metal and baked at 450° F.

The use of oils instead of oil-acids in the formulation of these compositions leads also to products which can dissolve some phosphoric acid. The action in this case is, first, the formation of mixed esters of glycerine and triethanolamine analogous to the mono- and di-acid glycerides which can be formed from oils with excess glycerine. In addition, there may be some soap formation by addition of any oil-acid present to the nitrogen atom of triethanolamine, and lastly, the mono- and di-acid esters can dissolve some free triethanolamine. As the resulting mixture (the formation of which is indicated by the batch becoming homogeneous) is further heated, glycerine and triethanolamine are lost by evaporation and the material approaches the mixed tri-ester composition. In correspondence with the different chemical actions involved, the mixture in this case is only partly soluble in alcohol at the start and may, or may not, pass through a soluble stage and eventually become insoluble, depending on the proportion of ingredients and heat treatment accorded them. This is explained by the following table of solubility in alcohol:

| | |
|---|---|
| Bodied tri-esters | Insoluble |
| Tri-esters | Insoluble |
| Bodied mono- and di-esters | Partly soluble |
| Mono- and di-esters | Soluble to partly soluble |
| Triethanolamine, glycerine, oil acids | Soluble |

The use of oils instead of oil-acids in these compositions, permits the use of heat-bodied material when it is desired to increase the viscosity, or reduce the crawling tendencies of the product when coated on steel and baked at high temperatures. It is, however, sometimes feasible to body the compound made from oil-acids after its formation, especially in the case of the wood oil derivative.

An effective composition for use alone on steel is made as follows:

| | Pounds |
|---|---|
| Linseed oil, bodied two hours at 625° F | 5.00 |
| Triethanolamine | 1.60 |

Heat one hour at 480° F. in covered kettle with slow stirring. Cool to 400° F. and add:

| | Pounds |
|---|---|
| Kerosene | 8.00 |
| High boiling coal-tar naphtha | 12.00 |

To the thinned material add in a slow steam while vigorously stirring:

85% commercial phosphoric acid_____ 1.00 pound

This composition yields a very thin hard film when flowed on steel and heated 10 minutes at 450° F.

Inasmuch as the conception of a true solution is not very rigidly defined by chemists, and because of difficulties in proof, I cannot say for certain that I have attained "true solubility" of phosphoric acid, or more exactly of a readily decomposable salt of it, in hydrocarbon thinners. I do have, however, a dispersion completely homogeneous to the eye, which cannot be separated by settling or centrifuging, even in part, but which readily yields phosphoric acid on water extraction. The phosphoric acid is as truly in solution as are the constituents of any ordinary varnish.

I have found that linseed oil acids, tung oil acids, castor oil, oleic acid, rosin, and organic acids in general having a molecular weight greater than about 150 act with triethanolamine, as well as serving the same purpose of making the phosphate salt hydrocarbon-soluble, and hence I regard the use of any fatty and resin acids used in varnish practice as being comprehended by my invention. The quality of the film, as affected by the acid or acids used, can be governed by the proper choice of the same as in standard varnish technology.

Commercial triethanolamine contains also diethanolamine, monoethanolamine, and in some instances propanolamines, and ethyl ethers of triethanolamine. These compounds function, with minor differences, in the same way as triethanolamine.

The use of acids of phosphorous of other concentrations, states of dehydration, or oxidation, or such acids partly or wholly neutralized with other materials, which may be soluble in hydrocarbon solutions of the esters of triethanolamine described above, does not depart from the spirit of this invention, since all such materials tend to reach a more or less constant, dehydrated, concentrated, state in the high temperature oven, where the oxidizing power of the air and reducing power of the metal and paint will determine the final stage of oxidation, and thus all such materials unfold essentially the same improvement in the protective qualities of the paint film against moisture.

The chemical nature of the compounds under discussion has not been rigidly proved by me, but the facts as far as known are without exception compatible with the assumed compositions, and the analogy with the behavior of glycerine, when substituted for the triethanolamine, is complete; as the following facts show:

When oil acids are added to triethanolamine, the salt or soap is formed and heat given off. The constituents and the product are all soluble in alcohol. After heating at 460°–480° F., the product becomes insoluble, just as fatty acid triglycerides are insolble in alcohol. Thus the salt or soap has rearranged to form the ester, which is further evidenced by the change in acidity the mixture being acid at first,—two excess molecules of acid over that necessary to form the soap being present,—whereas the product after heating is much less acid on titrating with phenolphthalein. The product, furthermore, reacts with phosphoric acid with more noticeable evolution of heat than the unesterified mixture which has already given off the heat due to soap formation.

An advantage of this invention over present modes of incorporation of phosphoric acid and derivatives in paint lies in the ready miscibility without special thinners of this product with all finishing materials except those containing much metallic soap (which disability is present in the entire class of products containing active phosphoric acid or derivatives). A further advantage is the very slight degree of attack of metal containers by this product in its liquid form and mixtures, combined with a ready availability of the acid in the presence of water or on heating. The advantages of having the substance yielding the phosphoric radical in solution in the paint is very great, since immiscible liquids settle out and cause corrosion of the container, and are difficult to redisperse, as well, whereas solids so far used are very difficult to grind and subject to rapid settling out, and injure the appearance of the paint film. Undesirable increases in the viscosity of the product, at once or on standing, are also usual accompaniments of the use of such liquids or solids, and must be combated with special thinners, etc.

As many apparently widely different embodiments of this invention may be made without departing from the spirit and scope thereof, it is to be understood that I do not limit myself to the specific embodiments thereof except as defined in the following claims.

I claim:
1. As a composition of matter, soluble in hydrocarbon solvents, the reaction product of an acid of phosphorous with an ester consisting of the reaction product of an alkylolamine and an organic compound selected from the class consisting of fatty acids, fatty oils, and natural resin acids.

2. As a composition of matter, soluble in hydrocarbon solvents, the reaction product of an acid of phosphorous with an hydroxy alkyl amine ester of an aliphatic monobasic acid having a molecular weight greater than 150.

3. As a composition of matter, the reaction product of a phosphoric acid with the triethanolamine ester of an aliphatic monobasic acid having a molecular weight greater than 150.

4. Phosphate of a triethanolamine ester of an aliphatic monobasic acid having a molecular weight greater than 150.

5. Phosphate of a triethanolamine ester of a fatty acid having a molecular weight greater than 150.

6. Phosphate of a triethanolamine ester of a natural resin acid.

7. A process which comprises adding an acid of phosphorous to a fatty acid ester of a hydroxy alkyl amine.

8. A process which comprises heating to esterifying temperature an aliphatic hydroxy amine with a compound selected from the class consisting of fatty oils and aliphatic monobasic acids having a molecular weight greater than 150, and reacting the ester thus formed with an acid of phosphorous.

9. A process which comprises heating to esterifying temperature triethanolamine with a fatty acid having a molecular weight greater than 150 and reacting the ester thus formed with a phosphoric acid.

10. A process which comprises heating to esterifying temperature triethanolamine with a resin acid, and reacting the ester thus formed with a phosphoric acid.

11. A process which comprises heating to esterifying temperature an aliphatic hydroxy amine with a fatty oil, and reacting the product thus formed with an acid of phosphorous.

12. A process which comprises heating to esterifying temperature triethanolamine with a fatty oil, and reacting the product thus formed with a phosphoric acid.

13. The process of claim 8 in which the acid of phosphorous is orthophosphoric acid.

14. The process of claim 9 in which the phosphoric acid is orthophosphoric acid.

15. The process of claim 11 in which the acid of phosphorous is orthophosphoric acid.

16. The process of claim 12 in which the phosphoric acid is orthophosphoric acid.

HERBERT O. ALBRECHT.